United States Patent
Nakagiri et al.

(10) Patent No.: US 9,559,391 B2
(45) Date of Patent: Jan. 31, 2017

(54) METHOD AND DEVICE FOR ADJUSTING BATTERY MODULE

(71) Applicant: PRIMEARTH EV ENERGY CO., LTD., Kosai-shi, Shizuoka (JP)

(72) Inventors: Yasushi Nakagiri, Toyohashi (JP); Daisuke Koba, Toyohashi (JP)

(73) Assignee: PRIMEARTH EV ENERGY CO., LTD., Kosai-shi (JP)

(*) Notice: Subject to any disclaimer, the term of this patent is extended or adjusted under 35 U.S.C. 154(b) by 167 days.

(21) Appl. No.: 14/565,579

(22) Filed: Dec. 10, 2014

(65) Prior Publication Data

US 2015/0180092 A1  Jun. 25, 2015

(30) Foreign Application Priority Data

Dec. 20, 2013  (JP) .................... 2013-263619

(51) Int. Cl.
| | |
|---|---|
| *H01M 10/44* | (2006.01) |
| *H01M 4/52* | (2010.01) |
| *H01M 4/38* | (2006.01) |
| *H01M 10/30* | (2006.01) |
| *H01M 10/34* | (2006.01) |
| *H01M 10/48* | (2006.01) |

(52) U.S. Cl.
CPC .......... *H01M 10/441* (2013.01); *H01M 4/383* (2013.01); *H01M 4/52* (2013.01); *H01M 10/30* (2013.01); *H01M 10/345* (2013.01); *H01M 10/482* (2013.01); *Y02E 60/124* (2013.01); *Y02W 30/84* (2015.05)

(58) Field of Classification Search
CPC ..... H01M 10/441; H01M 10/30; H01M 4/383

USPC ........................................... 320/118
See application file for complete search history.

(56) References Cited

U.S. PATENT DOCUMENTS

| | | | | |
|---|---|---|---|---|
| 5,773,958 A | * | 6/1998 | Gow et al. ......... | G01R 31/3658 320/118 |
| 5,912,090 A | * | 6/1999 | Nagai et al. ........ | H01M 2/0275 429/131 |
| 6,651,436 B2 | * | 11/2003 | Izumiura et al. ...... | B60K 6/485 180/65.26 |
| 6,956,298 B2 | * | 10/2005 | Kitajima et al. ...... | B60K 6/485 180/65.26 |

(Continued)

FOREIGN PATENT DOCUMENTS

| | | |
|---|---|---|
| JP | 05-144476 A | 6/1993 |
| JP | 11-341691 A | 12/1999 |

(Continued)

OTHER PUBLICATIONS

JP Office Action dated Oct. 20, 2015 as received in Application No. 2013-263619.

*Primary Examiner* — Sun Lin
(74) *Attorney, Agent, or Firm* — Maschoff Brennan (57) ABSTRACT

A method for adjusting a battery module including a plurality of connected cells is provided. Each of the connected cells is a nickel-metal hydride battery including a positive electrode containing an active material of which a main component is nickel hydroxide, a negative electrode containing a hydrogen adsorption alloy, and an electrolytic solution that is an alkali solution. The method includes over-discharging the battery module so that a state of charge reaches 0% in every one of the connected cells.

11 Claims, 4 Drawing Sheets

(56) References Cited

U.S. PATENT DOCUMENTS

| | | | |
|---|---|---|---|
| 9,059,486 B2* | 6/2015 | Mackintosh et al. | H01M 10/425 |
| 9,197,081 B2* | 11/2015 | Finberg et al. | H02J 7/0016 |
| 2008/0238371 A1* | 10/2008 | Tamezane | G01R 31/361 320/134 |
| 2009/0284226 A1 | 11/2009 | Komori et al. | |
| 2010/0194342 A1* | 8/2010 | Sugiyama et al. | B60L 11/1868 320/118 |
| 2010/0225276 A1* | 9/2010 | Sugiyama et al. | H01M 10/052 320/118 |
| 2010/0301807 A1* | 12/2010 | Gamboa et al. | H01M 2/0245 320/118 |
| 2011/0089905 A1* | 4/2011 | Yano | B60K 6/46 320/132 |
| 2011/0291619 A1* | 12/2011 | Asakura | H01M 10/441 320/118 |
| 2012/0032641 A1* | 2/2012 | Yun et al. | H02J 7/0016 320/118 |
| 2013/0106362 A1* | 5/2013 | Mackintosh et al. | H01M 10/425 320/136 |
| 2014/0021924 A1* | 1/2014 | Abe | H01M 10/44 320/118 |

FOREIGN PATENT DOCUMENTS

| | | |
|---|---|---|
| JP | 2004-319366 A1 | 11/2004 |
| JP | 2008-176967 A | 7/2008 |
| JP | 2009-277627 A | 11/2009 |

* cited by examiner

METHOD AND DEVICE FOR ADJUSTING BATTERY MODULE

BACKGROUND ART

The present invention relates to a method and a device for adjusting a battery module including connecting cells, which are nickel-metal hydride batteries, to reduce variations, resulting from usage, in the state of charge at the positive electrodes of the cells.

A nickel-metal hydride battery is a rechargeable battery that uses nickel hydroxide for the positive electrode, a hydrogen adsorption alloy for the negative electrode, and an alkali solution such as a sodium hydroxide solution for the electrolytic solution. Generally, in a nickel-metal hydride battery, the negative electrode has a greater capacity than the positive electrode so that the capacity of the positive electrode restricts the discharge capacity of the entire battery. This is referred to as positive electrode restriction. Positive electrode restriction suppresses internal pressure increases when the battery is over-discharged or over-charged. When the state of charge (SOC) at the positive electrode is 100%, the charge capacitance remaining at the negative electrode is referred to as a charge reserve. When the state of charge (SOC) at the positive electrode is 0%, the discharge capacitance remaining at the negative electrode is referred to as a discharge reserve. The state of charge of the positive electrode refers to the ratio of a charged active material amount relative to the entire active material amount contained in the positive electrode. Thus, when a positive electrode SOC is 0%, the ratio of the charged active material is 0%.

In a battery module that connects a plurality of cells, in cell temperature differences may result in the cells having different charging efficiencies. Continuous use of the battery module with each cell having a different charging efficiency would gradually result in the cells having different states of charge. When the battery module is discharged under such a condition, the cell with the positive electrode of which SOC becomes 0% most quickly restricts discharging in the other cells. This virtually decreases the entire discharge capacity. Accordingly, it is desirable that variations in the SOC at the positive electrodes of the cells be adjusted and reduced so that the capacity of each nickel-metal hydride battery approaches the initial capacity.

Japanese Laid-Open Patent Publication No. 2004-319366 describes an example of a method for restoring the capacity of a nickel-metal hydride battery by drawing hydrogen into a battery case or drawing an alkali metal or the like that reacts with the electrolytic solution and generates hydrogen into the battery case.

SUMMARY OF THE INVENTION

In the method described above, the negative electrode adsorbs hydrogen and increases the discharge reserve. Thus, this method is suitable when there is no more discharge reserve. However, this method cannot reduce SOC variations at the positive electrodes. Thus, there is a need for a method that reduces the variations in the states of charge of positive electrodes so that the capacity of a nickel-metal hydride battery approaches the initial capacity.

It is an object of the present invention to provide a method and device for adjusting a battery module that allows for reduction in variations of the states of charge at the positive electrodes of cells.

One aspect of the present invention is a method for adjusting a battery module including a plurality of connected cells. Each of the cells is a nickel-metal hydride battery including a positive electrode containing an active material of which the main component is nickel hydroxide, a negative electrode containing a hydrogen adsorption alloy, and an electrolytic solution that is an alkali solution. The method includes over-discharging the battery module so that a state of charge reaches 0% in every one of the cells.

A further aspect of the present invention is a device for adjusting a battery module including a plurality of connected cells. Each of the cells includes a positive electrode containing an active material of which the main component is nickel hydroxide, a negative electrode containing a hydrogen adsorption alloy, and an electrolytic solution that is an alkali solution. The device is configured to over-discharge the battery module so that a state of charge reaches 0% in every one of the cells.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE INVENTION

First Embodiment

A first embodiment of a method and a device for adjusting a battery module will now be described. In the present embodiment, the battery to which the method and device are applied is exemplified in a battery pack including a plurality of battery modules. The battery pack of the present embodiment is a rechargeable battery used as a power source for an electric vehicle or a hybrid vehicle.

Figure 1:
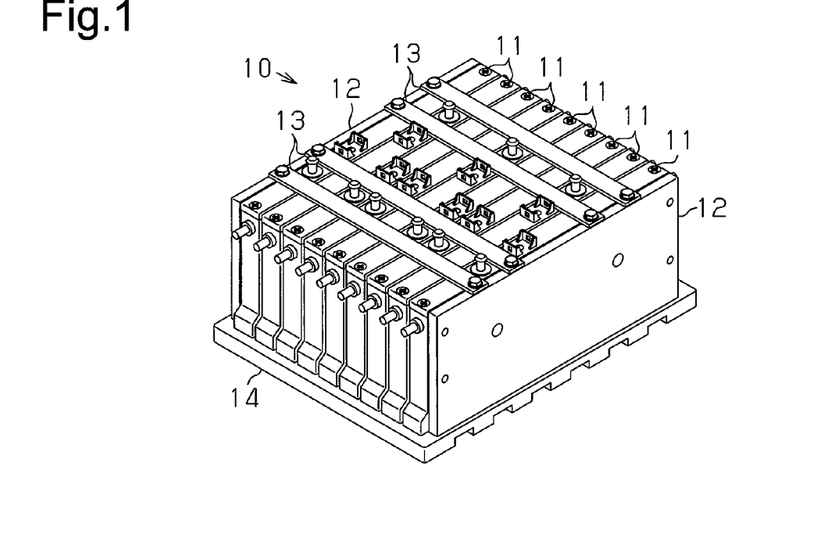
FIG. 1 is a perspective view showing a battery pack embodying the present invention.

As shown in FIG. 1, a battery pack 10 includes battery modules 11 arranged between two end blades 12. The end blades 12, coupling bands 13, which bridge the end blades

12, and a lower plate 14, which is located below the battery modules 11, couple the battery modules 11 to one another.

Figure 2:
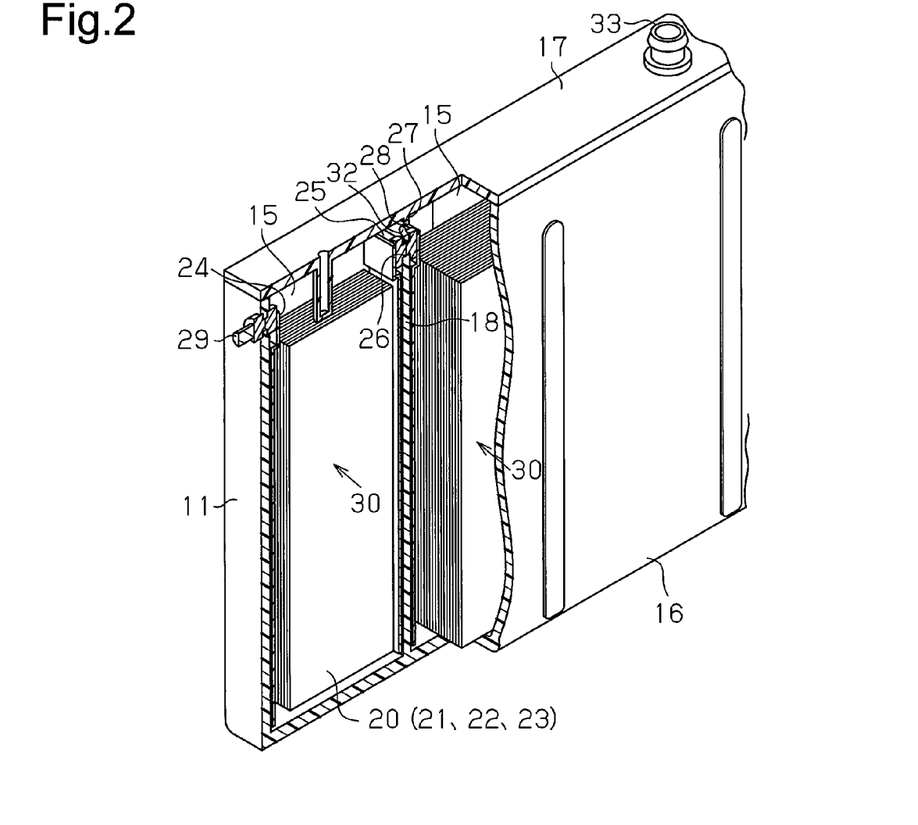
FIG. 2 is a perspective view partially in cross-section showing a battery module included in the battery pack of FIG. 1.

As shown in FIG. 2, each battery module 11 includes a monolithic battery case 16, which accommodates a plurality of battery cases 15, and a lid 17, which closes an upper opening of the monolithic battery case 16. Partition walls 18 partition the inner side of the monolithic battery case 16 into the battery cases 15.

Each battery case 15 accommodates an electrode plate group 20 and an electrolytic solution (not shown) that is an alkali solution such as a sodium hydroxide solution. Positive electrode plates 21, negative electrode plates 22, and separators 23 are stacked in the electrode plate group 20. The positive electrode plates 21 include an active material of which the main component is nickel hydroxide. The negative electrode plates 22 include a hydrogen adsorption alloy (MH). The separators 23 separate the positive electrode plates 21 and the negative electrode plates 22. The power generation elements form a cell 30, which is a nickel-metal hydride battery. Further, collector plates 24 and 25, which are respectively joined with the positive electrode plates 21 and the negative electrode plates 22, are accommodated in the battery case 15. In the present embodiment, six cells 30 are included in the monolithic battery case 16.

The discharge reaction of the positive electrode and the negative electrode in the nickel-metal hydride battery is represented by the half-reaction expressions (1) and (2) shown below. As a whole, the battery reaction progresses as represented by the reaction expression (3). Further, the characteristics are in that the electrolytic solution is not involved with the reaction and in that the electrolytic solution does not increase or decrease. During charging, the reaction progresses in the reverse direction.

Positive Electrode $$NiOOH + H_2O + e^- \rightarrow Ni(OH)_2 + OH^- \quad (1)$$

Negative Electrode $$MH + OH^- \rightarrow M + H_2O + e^- \quad (2)$$

Entire Cell $$NiOOH + MH \rightarrow Ni(OH)_2 + M \quad (3)$$

A through hole 26 extends through the upper portion of each partition wall 18 to connect the cells 30. Connection projections 27 and 28 respectively project from the upper portions of the collector plates 24 and 25. The connection projections 27 and 28 are spot-welded and connected to each other through the through holes 26. This electrically connects the adjacent cells 30 in series. A positive electrode connection terminal 29 and a negative electrode connection terminal (not shown) are respectively coupled to the battery cases 15 located at the two ends of the battery module 11. The positive electrode connection terminal 29 and the negative electrode connection terminal are respectively connected to bus bar modules (not shown). The total output of the six series-connected cells 30 is obtained through each bus bar module.

Further, each partition wall 18 includes a communication hole 32. Adjacent battery cases 15 are in communication with each other through the communication hole 32. The lid 17 includes a safety valve 33 that opens when the pressure of the monolithic battery case 16 exceeds a predetermined pressure. In the present embodiment, each battery module 11 is provided with a single safety valve 33. The safety valve 33 is closed under a normal internal pressure. When a cell 30 generates gas and the internal pressure becomes higher than a certain value, the safety valve 33 is opened and the gas is released from the battery module 11. More specifically, the battery cases 15 are in communication with one another through the communication holes 32. Thus, when gas is generated from at least one cell 30, the internal pressure of the entire monolithic battery case 16 rises and opens the safety valve 33. This allows gas to be released from the safety valve 33.

Figure 3A:
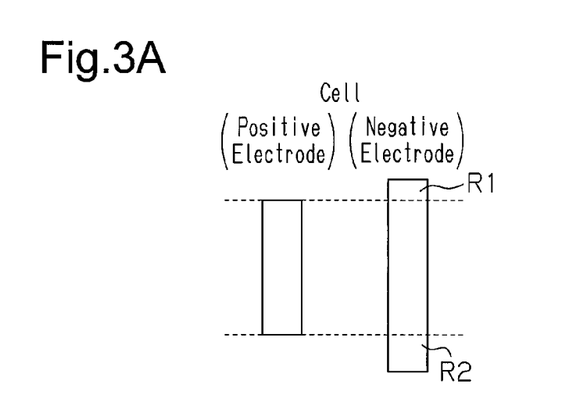
FIG. 3A is a chart showing the capacity balance of the positive electrode and the negative electrode in a cell to which positive electrode restriction is imposed.

Referring to FIG. 3A, each cell 30 is of a positive electrode restriction type in which the negative electrode has a greater capacity than the positive electrode. Under an initial condition such as when shipped from a factory, the capacity of the negative electrode includes a charge reserve R1, which is the remaining charge capacitance when the positive electrode is fully charged, and a discharge reserve R2, which is the remaining charge capacitance when the SOC of the positive electrode reaches 0%. Under the initial condition, each cell 30 has the same positive electrode SOC and the same negative electrode SOC. The positive electrode is fully charged when the active material of the positive electrode does not include any non-charged portion, that is, when the SOC is 100%. When the positive electrode SOC reaches 0%, that is, when the positive electrode does not include any charged portion, the SOC of the cell 30 is 0%.

Figure 3B:
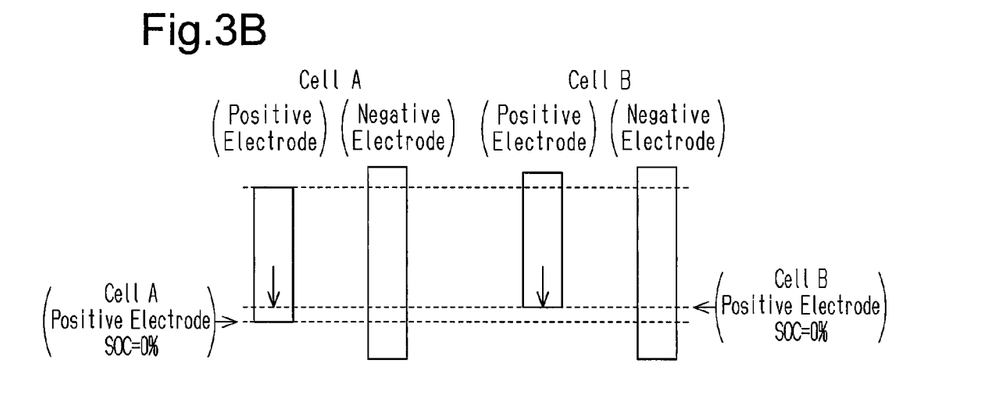
FIG. 3B is a chart showing the capacity balance in cells having different states of charge at the positive electrodes.

Referring to FIG. 3B, the battery capacity after repeating battery charging and discharging (after use) will now be described. As shown by cell A in the left side of FIG. 3B and cell B in the right side of FIG. 3B, when charging and discharging are repeated, factors such as temperature differences in the battery module 11 may result in positive electrodes having different SOCs. More specifically, when each cell is discharged, the potential at the positive electrode when discharging ends in cell A may differ from the potential at the positive electrode when discharging ends in cell B. In this case, during discharging, the positive electrode SOC reaches 0% in cell B most quickly. Thus, cell B restricts discharging in other cells, such as cell A. In such a case, the discharging capacity of the battery module 11 is decreased from the initial condition. Accordingly, the discharging capacity of the battery module 11 needs to be adjusted to approach the discharging capacity of the initial condition. As described above, the battery pack 10 of the present embodiment is used as the power source of an electric vehicle or a hybrid vehicle. Thus, the battery pack 10 may be used under harsh conditions, and the battery module 11 may easily fall into a situation such as that shown in FIG. 3B.

The method for adjusting the battery modules 11 of the battery pack 10 will now be described. In the present embodiment, without disassembling the battery pack 10, each battery module 11 undergoes an over-charging process and an over-discharging process. The battery pack 10, to which the adjusting method is applied, is a used battery pack. The processes will now be sequentially described.

(a) Over-Charging Process

Figure 4:
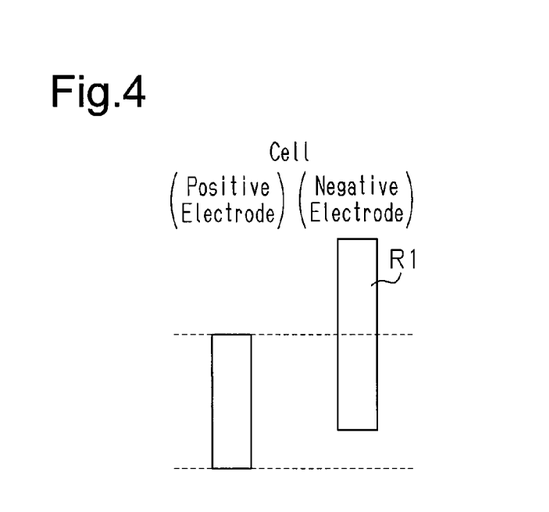
FIG. 4 is a chart showing the capacity balance in a cell in which the negative electrode no longer has a discharge reserve.

Generally, in a nickel-metal hydride battery, a small amount of hydrogen permeates through and leaks out of the monolithic battery case 16 and the lid 17, which correspond to a battery housing. In particular, such a leakage is apt to occur when using a plastic battery case. When hydrogen leaks out in such a manner, to maintain the balance between the divided hydrogen pressures in the battery case, hydrogen is emitted from the negative electrode hydrogen adsorption alloy in accordance with the hydrogen leakage amount. This decreases the negative electrode discharge reserve and consequently eliminates the discharge reserve as shown in FIG. 4.

When an over-discharging process, which will be described later, is performed under such a situation, the capacity balance of the positive electrode and the negative electrode is adversely affected. This deteriorates the battery. Thus, to sufficiently increase the discharge reserve, an over-charging process is performed before an over-discharging process is performed.

In an over-charging process, the battery pack 10 is connected to a charger (not shown). The battery pack 10 is continuously charged even after the positive electrodes are fully charged to perform over-charging. In the over-charging process, the battery pack 10 may be charged as a whole. Alternatively, each battery module 11 may be separately charged. The over-charging is performed so that the discharge reserve R2 subsequent to the adjustment does not exceed the discharge reserve R2 of the initial condition.

When performing over-charging, as apparent from the half-reaction expression (4) shown below, oxygen is generated from the positive electrode. Reactions occur at the negative electrode in which hydrogen is adsorbed in the hydrogen adsorption alloy as represented by the half-reaction expression (5) shown below and in which oxygen is adsorbed as represented by the half-reaction expression (6) shown below.

Positive Electrode $$OH^- \rightarrow \tfrac{1}{4}O_2 + \tfrac{1}{2}H_2O + e^- \qquad (4)$$

Negative Electrode $$M + H_2O + e^- \rightarrow MH + OH^- \qquad (5)$$

$$MH + \tfrac{1}{4}O_2 \rightarrow M + \tfrac{1}{2}H_2O \qquad (6)$$

When the oxygen generated from the positive electrode raises the internal pressure, the safety valve 33 opens and releases the oxygen. At the negative electrode, the semi-reaction expression (5) progresses and hydrogen is adsorbed. By releasing oxygen from the safety valve 33, the reaction of the semi-reaction expression (6) is suppressed, and the emission of hydrogen from the hydrogen adsorption alloy is suppressed. This ensures that hydrogen remains in the hydrogen adsorption alloy and allows for an increase in the discharge reserve, which has been decreased. This obviates negative electrode restriction in the cell 30.

(b) Over-Discharging Process

Then, discharging is performed so that the SOC reaches 0% in each cell 30 of the battery module 11. Here, over-discharging is performed by continuously discharging the cell 30 after the SOC reaches 0%.

Figure 5:
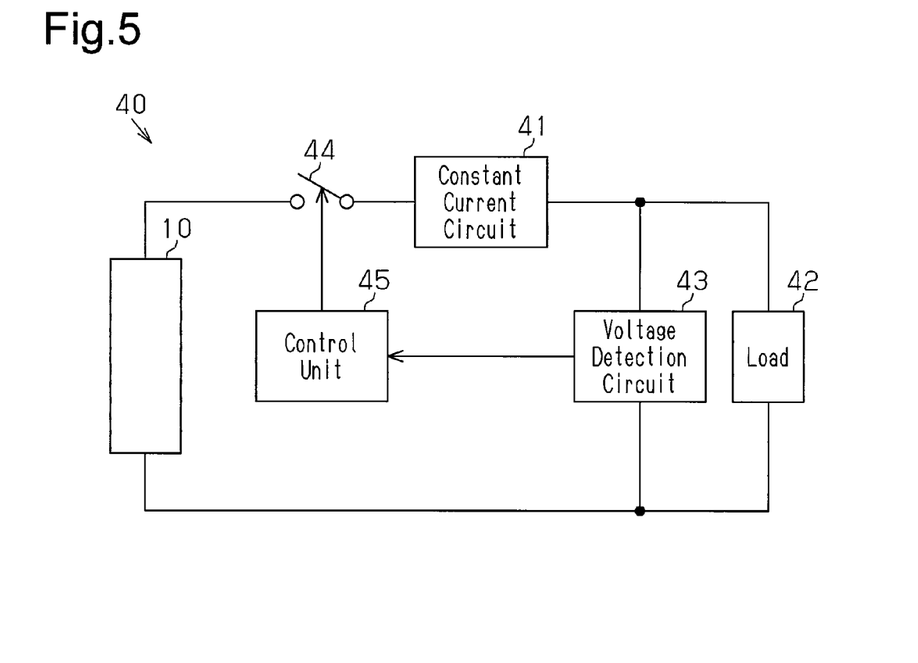
FIG. 5 is a block diagram showing an adjustment device for a battery module according to a first embodiment of the present invention.

Referring to FIG. 5, a discharger 40, which serves as an adjustment device of a battery module, includes a constant current circuit 41, which serves as a discharge unit, a discharging load 42, which serves as a discharge unit, a voltage detection circuit 43, which serves as a voltage measurement unit, and a control unit 45, which serves as a controller or a processor. The constant current circuit 41 regulates the discharge current to a constant value. The preferable discharging rate is 1.5 C to 4.5 C. The voltage detection circuit 43 measures the discharge voltage of the battery module 11. The connection terminal 29 of the battery module 11 is connected to the discharger 40 without disassembling the battery pack 10. When the battery module 11 is connected to the discharger 40, the control unit 45 controls a switch 44 to start discharging the battery module 11.

The control unit 45 receives the voltage value detected by the voltage detection circuit 43 and determines whether or not the SOC in each positive electrode has reached 0% based on the voltage value. When determining that the SOC has reached 0% in every one of the positive electrodes, the control unit 45 controls the switch 44 to stop discharging the battery module 11.

Figure 6:
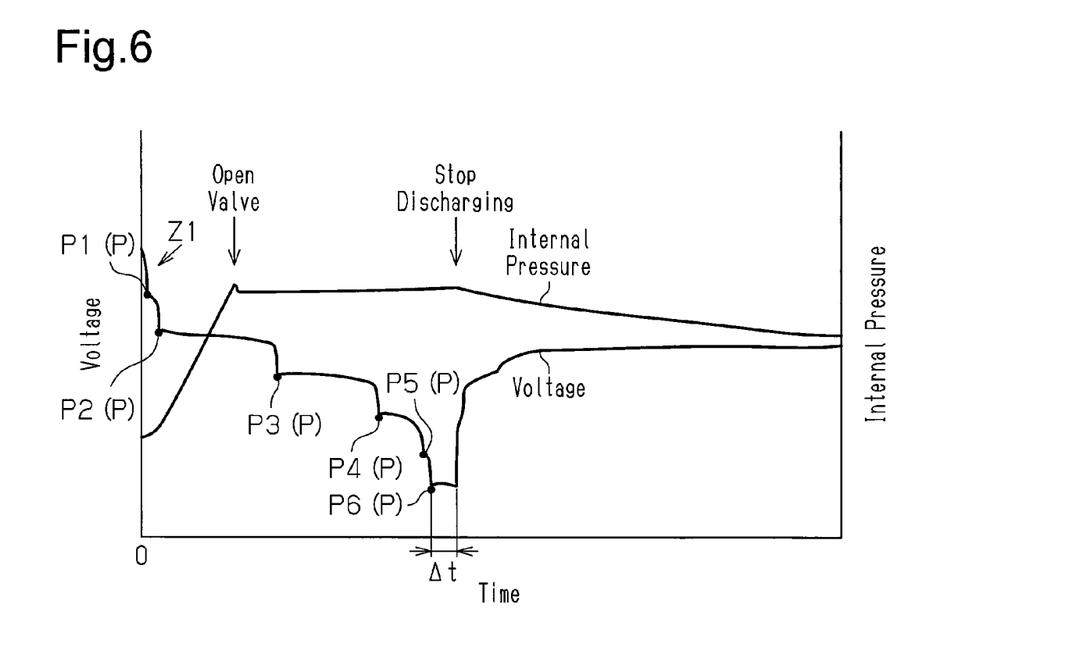
FIG. 6 is a graph plotted during discharging showing the voltage behavior and internal pressure of a battery module.

Referring to FIG. 6, the operation of the control unit 45 will now be described. During discharging, when at least one of the positive electrode in the cells 30 no longer has charged active material (positive electrode SOC 0%) and the SOC of the cell 30 reaches 0%, the voltage of battery module 11 suddenly falls as shown by range Z1 of the discharge voltage curve. By continuing discharging, in the cell 30 in which the SOC has already reached 0%, water molecules in the electrolytic solution are decomposed at the positive electrode in accordance with reaction expression (7), which is shown below. This generates hydrogen.

$$H_2O + e^- \rightarrow H_2 + OH^- \qquad (7)$$

To determine whether or not there is a cell 30 in which the SOC has reached 0%, the control unit 45 obtains the point where a sudden voltage drop ends. For example, based on the voltage measurement value received from the voltage detection circuit 43, the control unit 45 differentiates the voltage difference ΔV with time to calculate the voltage drop rate ΔV/Δt. Then, the control unit 45 obtains points where the voltage drop rate ΔV/Δt is large as points where sudden voltage drops start. Further, the control unit 45 obtains change points P (P1, P2, and so on) where the voltage drop rate ΔV/Δt changed from a large value to a small value as the points where sudden voltage drops end.

When detecting change point P1, the control unit 45 determines whether or not the voltage difference between when the sudden voltage drop started and when change point P1 appeared corresponds to a theoretical voltage of a single cell 30. When the voltage difference corresponds to the theoretical voltage of a single cell 30, the control unit 45 determines that there is one cell 30 in which the SOC has reached 0%. When the voltage difference corresponds to the theoretical voltage of two cells 30, the control unit 45 determines that there are two cells 30 in which the SOC has reached 0%.

In this manner, the control unit 45 detects the change points P based on the received voltage value and counts the number n of cells 30 in which the SOC has reached 0%. As described above, the positive electrode of a cell 30 in which the SOC has already reached 0% is over-discharged. Further, the water molecules of the electrolytic solution are decomposed at the positive electrode. This generates hydrogen and raises the internal pressure of the monolithic battery case 16. Thus, as shown by the internal pressure curve in FIG. 6, the safety valve 33 opens to release the hydrogen out of the monolithic battery case 16. This suppresses excessive increases of the internal pressure.

When the number n reaches N, which is the number of cells in the battery module 11, the control unit 45 determines that the SOC has reached 0% in the positive electrode of every one of the cells 30. In this case, the voltage behaves to appear as if the SOC has reached 0% in every one of the positive electrodes. However, the over-discharging process promotes an unbalanced reaction in the cell. Thus, the measured voltage may be an over-voltage measured when the reaction in the cell is unbalanced. The over-voltage may be an activation over-voltage resulting from the acquisition of activation energy used to activate a reaction material, a concentration over-voltage based on a concentration change of a reaction-related material that occurs at an electrode surface, a diffusion over-voltage, or the like. Thus, when the state of charge is 0% at every one of the positive electrodes, after the SOC becomes 0% in all of the cells 30, discharging continues over a preset time Δt. The duration of the discharging is obtained through experiments and is, for example, one to five minutes. As a result, hydrogen is generated from all of the positive electrodes. When the preset time Δt elapses, the control unit 45 controls the switch 44 and stops discharging the battery module 11. In the over-discharging process, polarity inversion occurs in the cell 30. Thus, when the discharging stops, the voltage of battery module 11 gradually returns to the original value. When the time Δt is too long, over-discharging would deteriorate the battery module 11. Thus, such a long time Δt is not preferred.

Figure 7:
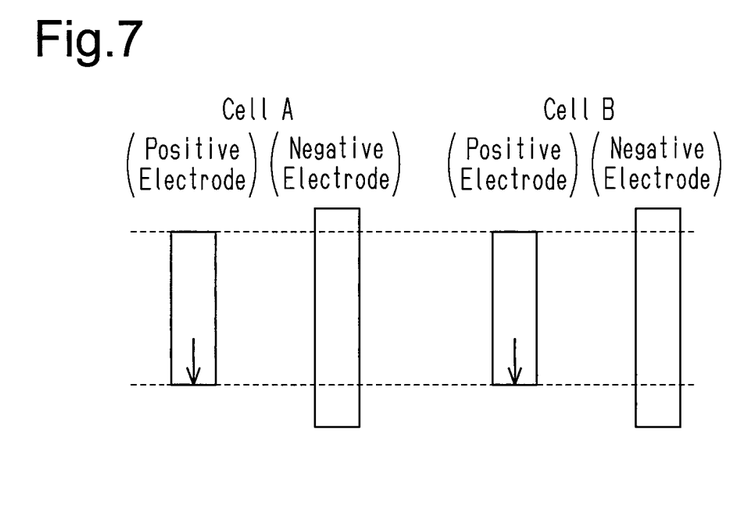
FIG. 7 is a chart showing the capacity balance of the positive electrode and the negative electrode in cells after an over-discharging process is performed.

As shown in FIG. 7, by performing an over-discharging process, charged active material is eliminated from the positive electrode of each cell 30. This reduces SOC variations at the electrodes and increases the discharge capacity of the battery module 11 so that the discharge capacity approaches the initial capacity. Further, the hydrogen generated during the over-discharge process is decomposed from the electrolytic solution and released out of the monolithic battery case 16 from the safety valve 33. Thus, the hydrogen does not directly affect the hydrogen adsorption amount of the negative electrode, and the capacity of the negative electrode is not adversely affected. Further, by setting the timing for ending the over-charging process based on when the SOC reaches 0 at the positive electrode of the cell 30 in the battery module 11, the amount of generated hydrogen may be suppressed. This allows for the amount of electrolytic solution to remain sufficient.

Further, this adjusting method becomes effective when applied to a nickel-metal hydride battery. For example, when the adjusting method is applied to a nickel-cadmium battery, the water molecules in the electrolytic solution are involved in the reaction of the entire battery, and the water molecules are consumed when the discharging the battery. Thus, over-discharging would increase the concentration of the electrolytic solution. Further, in a nickel-cadmium battery, over-discharging would cause dissolution and deposition resulting from the oxidation reduction of cadmium at the negative electrode. In contrast, as apparent from reaction expression (3), the electrolytic solution is not involved with the battery reaction of the entire nickel-metal hydride battery, and the water molecules in the electrolytic solution are involved only when over-discharging is performed. Thus, the electrolytic solution does not become insufficient even if over-discharging is performed, and an increase in the solute concentration of the electrolytic solution is limited. Further, dissolution and deposition of the hydrogen adsorption alloy at the negative electrode does not occur even when over-discharging is performed. In this manner, deterioration caused by over-discharging is limited in the nickel-metal hydride battery as compared with other batteries. Thus, the disadvantage for applying the above method to a nickel-metal hydride battery is small.

The first embodiment has the advantages listed below.

(1) In the over-discharging process, discharging is continued until the state of charge reaches 0% in every of the cells 30. That is, the battery module 11 is discharged so that the cells 30 are sequentially discharged from those in which the SOC reaches 0%. Further, while generating hydrogen from the positive electrodes of the cells 30 that have already been over-discharged, discharging is continued in other cells 30 until the SOC reaches 0%. Thus, the SOC ultimately becomes 0% in all of the cells 30, and SOC variations at the positive electrodes are reduced. This allows the capacity of the battery module 11 to approach the initial capacity.

(2) In the over-discharging process, at least some of the hydrogen generated from the cells 30 is released out of the safety valve 33. This limits excessive increases in the internal pressure. Further, the released hydrogen is generated when the electrolytic solution is decomposed at the positive electrode. When hydrogen continues to exist in the battery module 11, the negative electrode may adsorb the hydrogen and change the capacity of the negative electrode. However, by releasing the hydrogen, which is generated during the over-discharging, from the safety valve 33, the influence on the hydrogen adsorption amount at the negative electrode may be suppressed while further ensuring that SOC variations at the positive electrode are suppressed.

(3) In the over-discharging process, the voltage behavior of the battery module 11 is used to determine whether or not the SOC has reached 0%. Thus, the number of the cells 30 in which the SOC has reached 0% may be determined without disassembling the battery module 11 or the battery pack 10. Further, the voltage behavior of each battery module 11 is monitored. This allows for the determination of whether or not the SOC has reached 0% in each cell 30. Thus, the discharge amount can be minimized, and the amount of hydrogen decomposed from the electrolytic solution may be reduced.

Further, in the above embodiment, voltage behaviors such as voltage drop rates resulting from discharging are used to determine the SOC of the cells 30. Thus, in comparison to when determining whether or not the SOC of the cell reached 0% using other parameters, the determination of whether or not the SOC reached 0% is facilitated and ensured.

(4) The voltage measured in the over-discharging process is an over-voltage measured when the reaction in the battery is unbalanced. Further, discharging is continued even after determined from the over-voltage that the SOC has reached 0% in every one of the cells 30. Accordingly, reactions may be ultimately balanced in the cells, and SOC variations at the positive electrodes of the cells 30 may be reduced.

(5) By performing the over-charging process, the cells 30 may all be fully charged, and the discharge reserve capacity of the negative electrodes may be increased. Thus, the cells 30 may undergo positive electrode restriction before the over-discharging process. This obviates negative electrode restriction in which the capacity of the nickel-metal hydride battery is limited by the negative electrode capacity. Accordingly, this avoids determinations that the state of charge of the cell 30 has reached 0% before the state of charge reaches 0% at the negative electrode prior to the positive electrode due to the negative electrode restriction imposed on the cell 30.

(6) Even though there is no state of charge variations at the positive electrode when the battery module 11 is unused, SOC variations may occur at the positive electrodes when the battery module 11 is used. Further, differences in the usage conditions results in the positive electrodes having different SOC variation rates. In the above embodiment, the adjustment method using over-discharging is applied to the used battery module 11, and the variation may therefore be reduced even when the SOC variation rate of the positive electrodes is not known. Thus, the above embodiment becomes even more effective when the adjustment method using over-discharging is applied to the used battery module 11.

Second Embodiment

Figure 8:
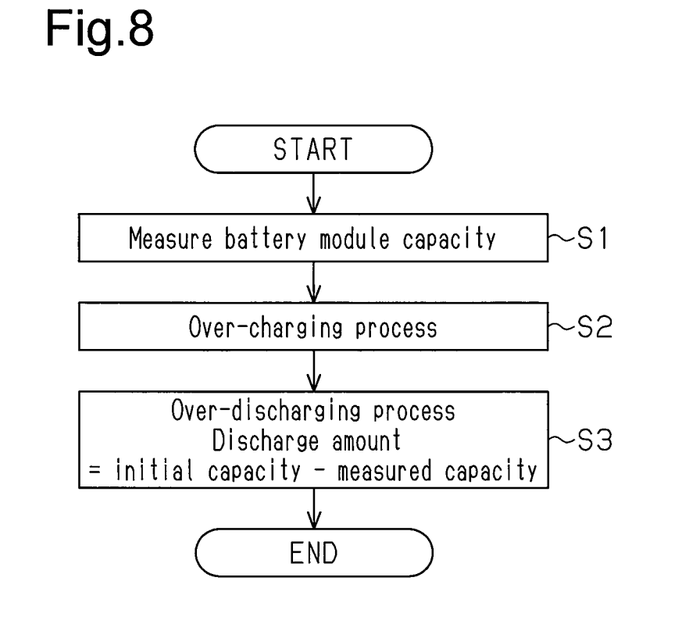
FIG. 8 is a flowchart showing a method for adjusting a battery module according to a second embodiment of the present invention.

A second embodiment of the present invention will now be described with reference to FIG. 8. The second embodiment differs from the first embodiment only in the procedures of the battery module adjusting method. Thus, same reference numerals are given to those components that are the same as the corresponding components of the first embodiment. Such components will not be described in detail.

The battery module adjusting method of the present embodiment will now be described with reference to FIG. 8. First, the discharging capacity of the battery module 11 is measured just before over-discharging is performed (step S1). A known method may be used to measure the charging capacity. For example, after charging the battery module 11 and detecting a fully charged condition through a known method using charging characteristics, such as detection based on the temperature rising rate ($\Delta T/\Delta t$ detection) or detection based on the voltage drop under a fully charged condition ($-\Delta V$ detection), discharging is performed at a constant current value until the battery voltage becomes a discharging completion voltage. The current value during discharging and the discharging time are multiplied to obtain the discharging capacity of the battery module 11.

Then, in the same manner as the first embodiment, an over-charging process is performed on the battery module 11 (step S2). This increases the discharge reserve of the negative electrode and imposes the positive electrode restriction on the cell 30, which was in the negative electrode restriction condition.

Then, the battery pack 10 is connected to the discharger 40 used in the first embodiment to discharge each battery module 11. While calculating the voltage drop rate $\Delta V/\Delta t$, the control unit 45 determines whether or not there is a sudden voltage drop indicating that the SOC is 0% in at least one cell 30. Further, if the voltage difference $\Delta V$ of the drop from when discharging starts to when the SOC reaches 0% in a single cell 30 corresponds to a theoretical voltage of a single cell 30, it may be determined that the SOC in at least one cell 30 has become 0% when the decrease in the measured voltage from when discharging started is greater than or equal to the voltage difference $\Delta V$.

When the control unit 45 determines that the SOC has become 0% in at least one cell 30, the control unit 45 continuously discharges a discharge amount from when the change point P1 is detected, which is set as the difference obtained by subtracting the discharge capacity measured prior to the discharging process from the nominal capacity of the battery module 11 (nominal capacity−measured capacity). The calculated difference corresponds to the capacity difference between the positive electrode of the one of the cells 30 in which the charged portion of the active material becomes null most quickly and the positive electrode of the one of the cells 30 in which the charge portion of the active material becomes null most slowly. By setting the discharge amount as the difference, SOC variations may be reduced in the positive electrode without monitoring the voltage behavior of the battery module 11 until the discharging ends.

After further continuing discharging of the calculated discharge amount, discharging is continued over the predetermined time $\Delta t$ in the same manner as the first embodiment. Then, the over-discharging process is terminated.

In addition to advantages (1) to (6) of the first embodiment, the second embodiment has the following advantage.

(7) In the over-discharging process of the present embodiment, the discharge amount from when the state of charge reaches 0% in at least one of the cells is the difference of the initial capacity of the nickel-metal hydride battery and the capacity before the over-discharging process is started. Thus, variations in the states of charge of the positive electrode may easily be reduced without determining from the discharge voltage behavior whether or not the state of charge has reached 0% in every one of the cells.

It should be apparent to those skilled in the art that the present invention may be embodied in many other specific forms without departing from the spirit or scope of the invention. Particularly, it should be understood that the present invention may be embodied in the following forms.

In the second embodiment, the over-discharging process may be performed on the entire battery pack 10 instead of each battery module 11. In this case, in the discharge capacity measurement step, the discharge capacity of the battery pack 10 is measured instead of the battery module 11.

In each of the above embodiments, discharging is continued even after determining that the SOC has reached 0% in every one of the cells 30. However, when it can be expected that over-voltage is unlikely to occur such as when the discharge rate is relatively low, discharging may be stopped when determining from the voltage behavior that the SOC has reached 0% in every one of the cells 30.

In each of the above embodiments, the over-charging process is performed. However, the over-charging process may be omitted when, for example, it becomes evident through experiments or the like that the state of charge at the negative electrode has not significantly shifted from the original condition.

In each of the above embodiments, a single safety valve 33 is provided for each battery module 11. However, a plurality of safety valves 33 may be provided for each battery module 11. Further, a safety valve 33 may be provided for each cell 30 of the battery module 11. In this case, the communication hole 32 may be omitted from each partition wall 18.

In each of the above embodiments, the battery module 11 includes six cells 30 but may include any number of cells 30 that is greater than two. Further, the battery pack 10 is not limited to the structure described above. For example, the end plates 12 may be omitted. Further, the battery module adjusting method according to the present invention has high versatility and may be applied to a battery module other than the battery module 11 described above.

In the over-discharging process, hydrogen may be released from a hole other than the safety valve 33. For example, another valve device may be opened to release hydrogen.

In each of the above embodiments, the battery pack 10 including the battery modules 11 is over-discharged. However, the battery pack 10 may be disassembled to over-discharge each battery module 11.

In each of the above embodiments, the battery module adjusting method is applied to the battery module 11 including the series-connected cells 30. However, state of charge variations caused by temperature variations or the like also occur when the battery module 11 includes parallel-connected cells 30. Thus, the battery module adjusting method may also be applied to a parallel-connection battery module 11. Further, in a battery module in which the cells 30 are connected in parallel, the adjusting method may be performed with the cells 30 connected in parallel. Alternatively, the parallel-connected cells 30 may be connected in series when performing the over-discharging process and be reconnected in parallel after the over-discharging process ends. The present invention is more advantageous when over-discharging is performed on a series connection than when over-discharging is performed on a parallel connection since less electricity is used.

In each of the above embodiments, the battery module adjusting method is applied to the battery modules 11 of the battery pack 10 but may be applied to a battery module that includes a plurality of cells but does not form a battery pack.

In each of the above embodiments, the battery module adjusting method and adjusting device are applied to a battery module used as a power source of an electric vehicle or a hybrid vehicle. However, as long as the battery module has state of charge variations at the positive electrodes of the cells, the battery module may be used as a power supply for other devices.

The present examples and embodiments are to be considered as illustrative and not restrictive, and the invention is not to be limited to the details given herein, but may be modified within the scope and equivalence of the appended claims.

The invention claimed is:

1. A method for adjusting a battery module including a plurality of connected cells, wherein each of the connected cells is a nickel-metal hydride battery including a positive electrode containing an active material of which a main component is nickel hydroxide, a negative electrode containing a hydrogen adsorption alloy, and an electrolytic solution that is an alkali solution, wherein the method comprises:
over-discharging the battery module so that a state of charge reaches 0% in every one of the connected cells,
wherein the over-discharging the battery module includes setting a discharge amount from when the state of charge reaches 0% in at least one of the connected cells to be greater than or equal to a difference between an initial capacity of the battery module and a capacity of the battery module when starting the over-discharging.

2. The method according to claim 1, wherein the over-discharging the battery module includes releasing at least some of hydrogen generated from the connected cells out of one or more safety valves.

3. The method according to claim 1, wherein the over-discharging the battery module includes measuring a voltage at the battery module and determining from a behavior of the voltage whether or not the state of charge of each of the connected cells is 0%.

4. The method according to claim 1, further comprising over-charging the battery module so that every one of the connected cells is fully charged before over-discharging the battery module, wherein the over-charging the battery module includes releasing at least some of oxygen generated from the positive electrode out of one or more safety valves.

5. The method according to claim 1, wherein a used battery module is used as the battery module that is to be discharged.

6. A method for adjusting a battery module including a plurality of connected cells, wherein each of the connected cells is a nickel-metal hydride battery including a positive electrode containing an active material of which a main component is nickel hydroxide, a negative electrode containing a hydrogen adsorption alloy, and an electrolytic solution that is an alkali solution, wherein the method comprises:
over-discharging the battery module so that a state of charge reaches 0% in every one of the connected cell,
wherein the over-discharging the battery module includes continuing discharging even after determining that the state of charge has reached 0% in every one of the connected cells.

7. The method according to claim 6, wherein the over-discharging the battery module includes measuring a voltage at the battery module and determining from a behavior of the voltage whether or not the state of charge of each of the connected cells is 0%.

8. A device for adjusting a battery module including a plurality of connected cells, wherein each of the connected cells includes a positive electrode containing an active material of which a main component is nickel hydroxide, a negative electrode containing a hydrogen adsorption alloy, and an electrolytic solution that is an alkali solution, wherein
the device is configured to over-discharge the battery module so that a state of charge reaches 0% in every one of the connected cells,
wherein the over-discharging the battery module includes setting a discharge amount from when the state of charge reaches 0% in at least one of the connected cells to be greater than or equal to a difference between an initial capacity of the battery module and a capacity of the battery module when starting the over-discharging.

9. The device according to claim 8, comprising:
a discharge unit that discharges the battery module;
a voltage measurement unit that measures a voltage at the battery module; and
a control unit that controls discharging of the battery module based on the voltage obtained by the voltage measurement unit, wherein the control unit is configured to perform over-discharging with the discharge unit by determining the state of charge in every one of the connected cells from a behavior of the obtained voltage.

10. A device for adjusting a battery module including a plurality of connected cells, wherein each of the connected cells includes a positive electrode containing an active material of which a main component is nickel hydroxide, a negative electrode containing a hydrogen adsorption alloy, and an electrolytic solution that is an alkali solution, wherein
the device is configured to over-discharge the battery module so that a state of charge reaches 0% in every one of the connected cells,
wherein the over-discharging the battery module includes continuing discharging even after determining that the state of charge has reached 0% in every one of the connected cells.

11. The device according to claim 10, comprising:
a discharge unit that discharges the battery module;
a voltage measurement unit that measures a voltage at the battery module; and
a control unit that controls discharging of the battery module based on the voltage obtained by the voltage measurement unit, wherein the control unit is configured to perform over-discharging with the discharge unit by determining the state of charge in every one of the connected cells from a behavior of the obtained voltage.

* * * * *